(No Model.) 5 Sheets—Sheet 1.

E. L. GAYLORD.
MACHINE FOR PREPARING MITER JOINTS FOR FASTENINGS.

No. 313,198. Patented Mar. 3, 1885.

Witnesses
J. S. Williamson
W. J. Haviland

Inventor
Edward L. Gaylord
By Smith & Hubbard
Attys.

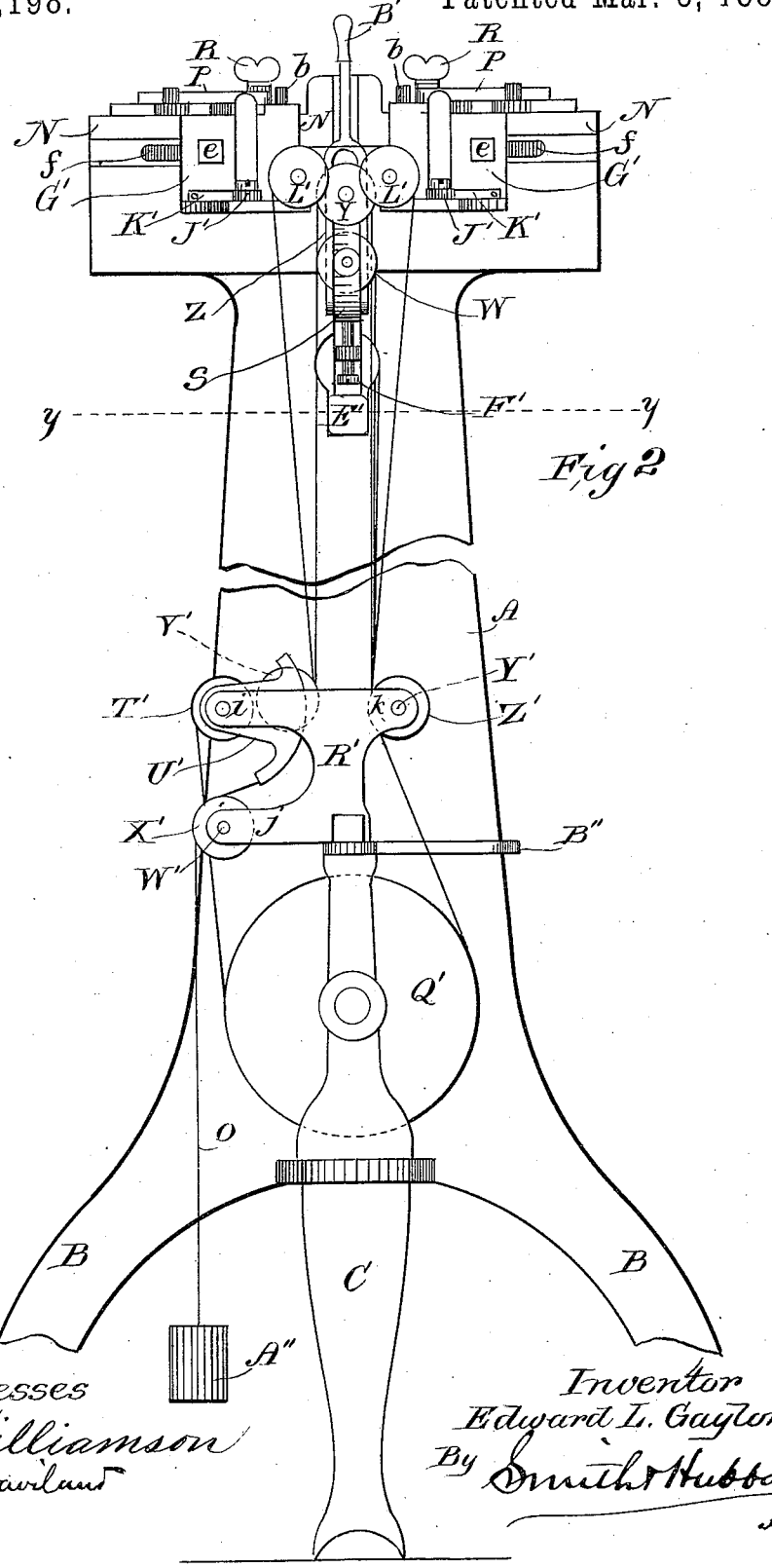

(No Model.) 5 Sheets—Sheet 3.
E. L. GAYLORD.
MACHINE FOR PREPARING MITER JOINTS FOR FASTENINGS.
No. 313,198. Patented Mar. 3, 1885.
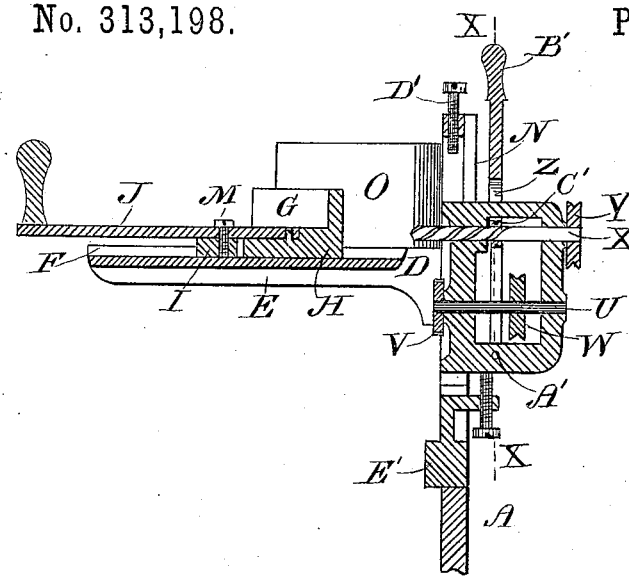
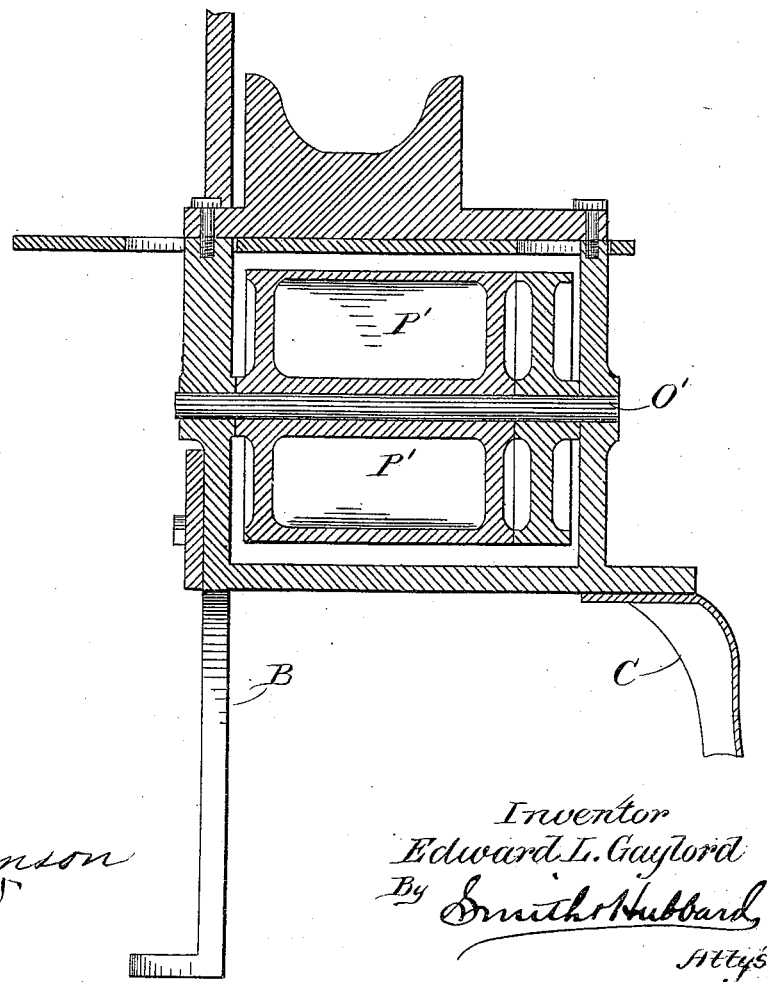
Witnesses
J. S. Williamson
W. T. Havland
Inventor
Edward L. Gaylord
By Smith & Hubbard
Attys.

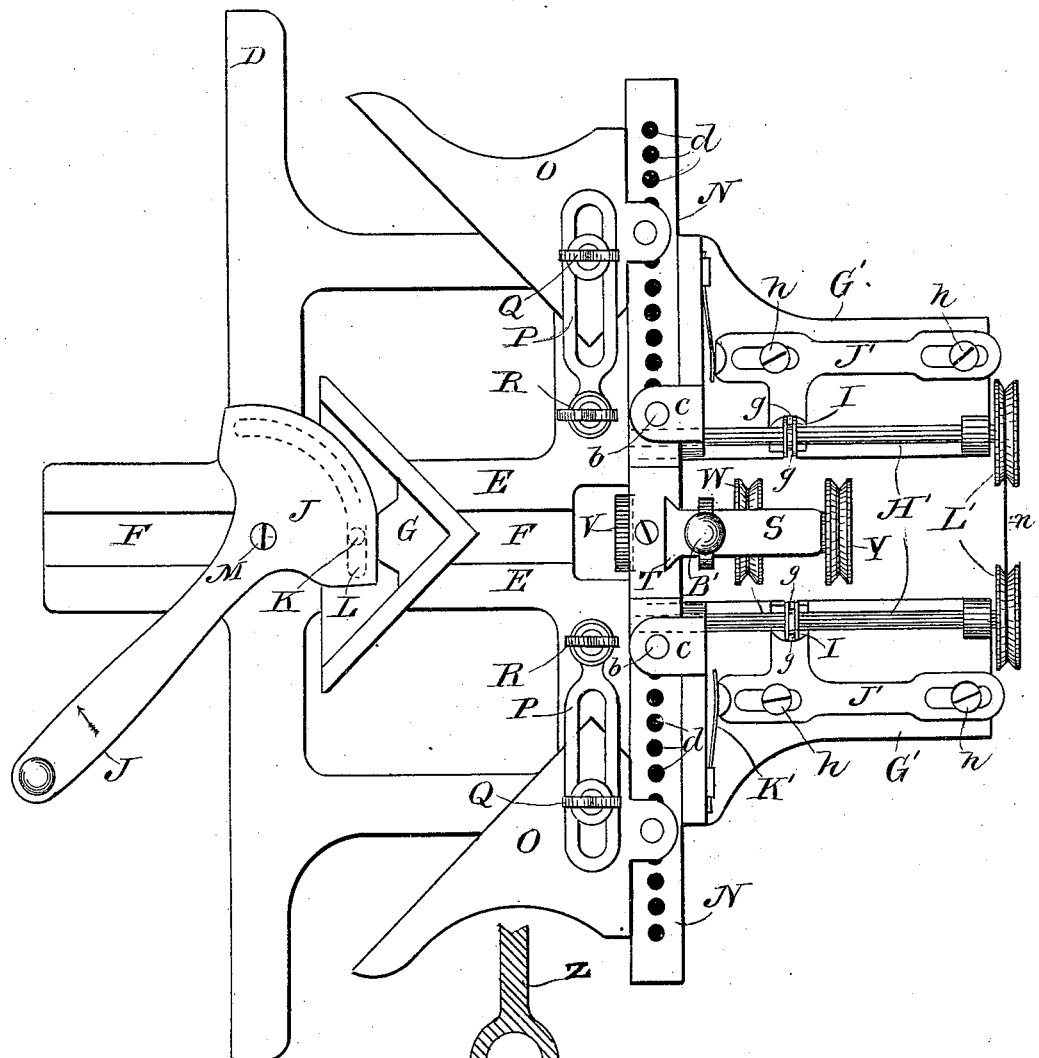

(No Model.) 5 Sheets—Sheet 5.

E. L. GAYLORD.
MACHINE FOR PREPARING MITER JOINTS FOR FASTENINGS.

No. 313,198. Patented Mar. 3, 1885.

Witnesses
S. S. Williamson
W. J. Hawland

Inventor
Edward S. Gaylord
By Smith & Hubbard
Atty's.

UNITED STATES PATENT OFFICE.

EDWARD L. GAYLORD, OF BRIDGEPORT, CONNECTICUT.

MACHINE FOR PREPARING MITER-JOINTS FOR FASTENINGS.

SPECIFICATION forming part of Letters Patent No. 313,198, dated March 3, 1885.

Application filed September 8, 1884. (No model.)

*To all whom it may concern:*

Be it known that I, EDWARD L. GAYLORD, a citizen of the United States, residing at Bridgeport, in the county of Fairfield and State of Connecticut, have invented certain new and useful Improvements in Machines for Adapting the Meeting Edges of Miter and Other Joints for Fastening Devices; and I do hereby declare the following to be a full, clear, and exact description of the invention, such as will enable others skilled in the art to which it appertains to make and use the same.

My invention relates to certain novel and useful improvements in machines for adapting the meeting edges of miter and other joints for fastening devices, and has for its object to provide such a machine as shall readily and accurately accomplish the desired result; and with these ends in view my invention consists in the details of construction and combination of elements hereinafter fully and in detail explained, and then specifically designated by the claims.

In order that those skilled in the art to which my invention appertains may more fully understand its construction and operation, I will proceed to describe the same in detail, referring by letter to the accompanying drawings, forming a part of this specification, in which—

Figure 1:
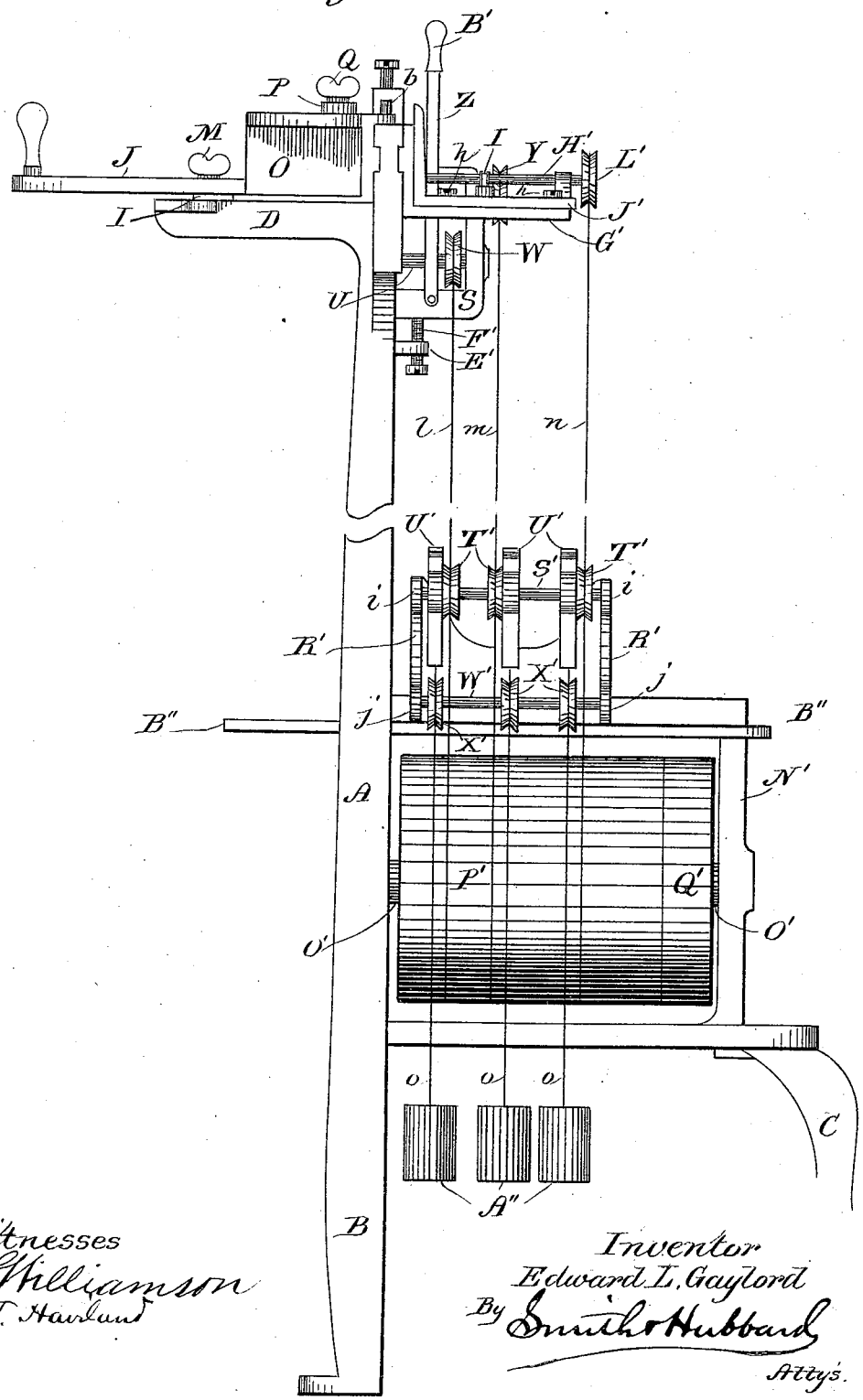
Figure 6:
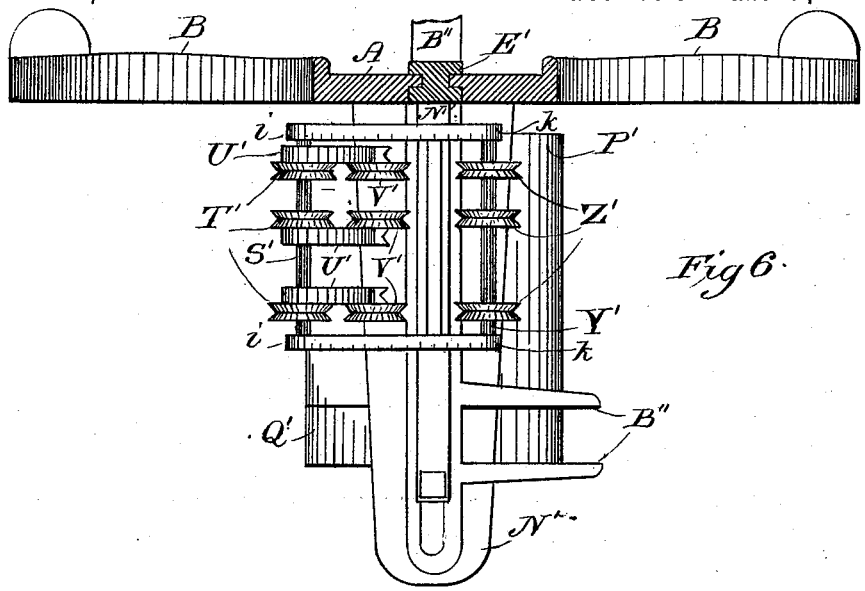

Figure 1 is a side elevation; Fig. 2, a rear view; Fig. 3, a central vertical section; Fig. 4, a plan view of the table and parts supported thereby; Fig. 5, a detail central vertical section taken at the line X X of Fig. 3; Fig. 6, a cross-section taken at the line Y Y of Fig. 2, and Fig. 7 a detail horizontal section showing the relative position of the guide-block, abutment-rail, and adjustable bracket.

Similar letters denote like parts in the several figures of the drawings.

A is the stand or frame-work supported by legs B B and C. Near the top of this stand is formed or secured a platform or table, D. This table is preferably formed of open-work having a central rib, E, in which is formed a dovetailed groove, F, throughout its entire length.

G is a clamp-block, rectangular in shape, having a dovetailed projection, H, on its under side, which fits and moves in the corresponding groove, F, in the rib E. In this groove also fits and moves a dovetailed block, I, having pivotally attached thereto the cam-lever J, the inner end of which is adapted to cam against the clamp-block G, the latter being returned by a pin, K, projecting upward therefrom and traveling in a slot, L, in the cam, the contour of which slot corresponds to that of the operating-surface of the cam. The screw M which secures the cam-lever J to the block I passes through said block and bears against the bottom of the groove F, for the purpose of setting and retaining the block in any required position for the accommodation of the work.

N is an abutment-rail, to which the guide-blocks O are adjustably secured, the method and purpose of which will be presently explained.

P are open links, which are held in position on the top of the guide-blocks O by means of the set-screws Q, which pass into said blocks. Through the outer ends of these links pass set-screws R, the purpose of which will be hereinafter set forth.

S is a frame, dovetailed at T so as to fit and slide vertically in a corresponding dovetailed groove in the stand A. In this frame is journaled the shaft U, on the inner end of which is secured a circular saw, V, the inner surface of said saw being just inside of the vertical plane of the abutment-rail N. Also on the shaft U, within the frame S, is secured a grooved pulley, W, by which the shaft receives its motion. Above the saw-shaft, and in the same plane and frame, is journaled a twist-drill, X, adapted to be rotated by the grooved pulley Y, secured thereto outside the frame.

Z is a forked lever pivoted to the frame at A' and extending upward above the level of the abutment-rail, where it terminates in a handle, B'.

Secured to the drill-shank is a grooved collar, C', into which project pins $a$ from each side of the forked lever Z, by means of which the drill may be moved longitudinally, as will readily be understood by reference to Fig. 5.

D' is a set-screw, which passes through the top of the abutment-rail. The use of this is to limit the upward movement of the frame S.

E' is a bracket, which is secured to the stand by tongue-and-groove ways, (see Fig. 6,) and through an outward projection of said bracket a set-screw, F', is provided which limits the downward movement of the frame.

Figure 7:
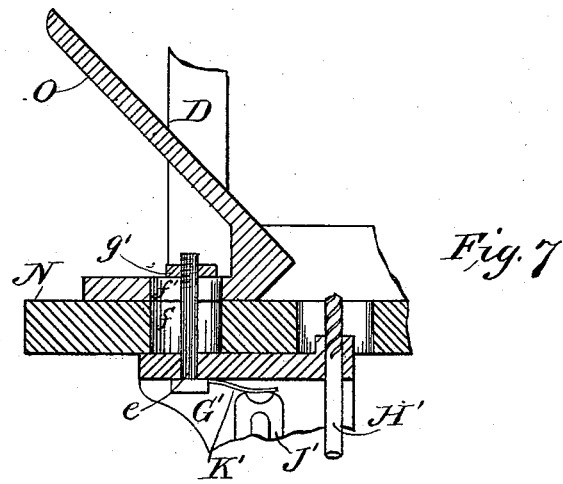

G' are brackets adjustably secured to the abutment-rail by means of pins b, passing through the lugs c into a series of holes, d, along the top of the rail, and bolts e, which pass through holes in the brackets and extend through elongated slots $f f'$ in the rail and guide-blocks, respectively, nuts $g'$ being run on said bolts so that the several parts may be clamped together, the object of this construction being to enable the brackets and guide-blocks to be adjusted simultaneously with or independently of each other, all of which will be readily understood by reference to Fig. 7.

H' are shafts journaled on the brackets G', the inner ends of said shafts being formed into drills, the use of which will be hereinafter set forth. (See Fig. 7.)

I' are collars having grooves, in which fit shoes $g$ on the sliding bars J'. These sliding bars are secured to the brackets G' by the screws $h$ in such manner as to permit a free longitudinal sliding movement of said bars.

K' are flat springs, secured to the brackets and bearing against the inner ends of said bars, so as to return them to their normal position after they have been drawn forward by the operator.

On the outer ends of the shafts H' are grooved pulleys, L', by means of which motion is imparted to said shafts.

N' is the drum-frame, which is supported by the stand and the leg C. Within this frame is journaled the shaft O', carrying a drum, P', and supporting a loose pulley, Q'.

R' are short standards, projecting upward from the drum-frame and having arms $i j k$. (See Figs. 1 and 2.) Between the arms $i$ extends a stationary rod or shaft, S', on which is journaled a series of grooved pulleys, T'. Also on this shaft is journaled a series of equalizers, U', corresponding in number to the pulleys T'. The inner extremities of these equalizers are formed in grooved arcs described from the shaft S' as a center. To the equalizers, and near their inner extremities, are journaled grooved pulleys V'.

W' is a stationary shaft, extending between the arms $j'$, and having journaled thereon a series of grooved pulleys, X', corresponding in number to the equalizers and in the same vertical plane.

Y' is a shaft extending between the arms $k$, and on which is journaled the grooved pulleys Z'. (See Fig. 6.)

$l$, $m$, and $n$ are round belts, which run over the grooved pulleys W, Y, and L', respectively, and down around the pulleys V', up over the pulleys T', down around the drum P', up to the inner side of the pulleys Z', and from thence back to their respective pulleys W, Y, and L'.

$o$ are cords or wires, the upper ends of which are attached to the upper portions of the equalizers and pass around the arcs of said equalizers and down over the pulleys X', and having attached at their lower ends a weight, A". The object of these weights and cords is to give the belts $l m n$ the desired tension, and at the same time admit of their being lengthened and shortened without interfering with the operation of the machine. Power is imparted to the drum by a belt (not shown) running from any convenient pulley.

B" is a belt-shifter, of any desired construction, extending from over the loose pulley Q' to the front of the machine within convenient reach of the operator. By means of this belt-shifter the power-belt may be shifted from the pulley to the drum, and vice versa.

From the foregoing description the operation of my improvement will obviously be as follows: When a section of a miter-joint is to be prepared, it is inserted between one of the guide-blocks O and the clamp-block G until its mitered end abuts against the rail N, when, by moving the cam-lever in the direction indicated by the arrow, (see Fig. 4,) the clamp-block will be caused to bind and hold the material to be operated on.

I preferably make the sawing the first operation, and this is accomplished by simply grasping the handle B' and raising the frame S, which carries the saw against the rear face of the molding, and as the horizontal plane of said saw is being continually elevated by the raising of the frame, a circular cut will be made in the meeting edge of the joint-section, which will be understood by reference to my application filed September 3, 1884, bearing Serial No. 142,152. After this operation the frame is allowed to drop back to its normal position by releasing the handle.

The next operation in order is the slotting, and this is done by grasping the handle and pulling it forward, which will cause the drill X to penetrate the joint-section. The frame S is now raised, causing the drill to elongate the hole which it forms. The frame is then allowed to fall and the handle is shoved back. The two sections of the joint are treated in the same manner, the only difference being that they are clamped between opposite guide-blocks and ends of the clamp. The brackets carrying the dowel-drills are readily adjusted laterally so as to form the dowel-holes in the proper location in moldings of various widths.

In preparing joints for moldings and the like it is desirable to gage or level them from the top, as the bottom is in many instances irregular and uneven. To do this it is only necessary, after placing the molding against the abutment-rail, to set the screws R down against the top of the molding, the open links P and set-screws Q admitting of any required adjustment of the screws R.

I have not entered into any detailed description of the mechanism shown for applying power to the drills and saw, as I do not wish to be confined to any particular means for accomplishing this result, for it is obvious that the said tools may be operated by hand, as by a crank-arm, or by any other well-known method, the gist of my invention resting in the broad idea of adapting the drills and saw to cut away and recess the sections of a miter-joint for the express purpose of accommodating the fastening device shown and described in my said application hereinbefore referred to.

Having thus fully described my invention, what I claim as new, and desire to secure by Letters Patent, is—

1. In a machine for preparing the meeting edges of miter or other joints for the accommodation of fastening devices, a vertically-reciprocating frame carrying a circular saw and a longitudinally-reciprocating drill, in combination with adjustable devices for clamping the moldings in position, substantially as set forth.

2. In a machine for preparing the meeting edges of miter and other joints for the accommodation of fastening devices, the frame adapted to reciprocate vertically within dovetailed bearing in the stand, and carrying the saw and slotting-drill, and pulleys for rotating the same, in combination with the gripping devices which hold the said edges against the abutment-rail within the field of operation of said saw and drill, substantially as set forth and shown.

3. In a machine as described, the platform having the abutment-rail extending transversely thereon perforated and slotted as described, in combination with the guide-blocks resting on said platform and adjustable along said rail, and having attached thereto leveling-links, adjustable brackets arranged to slide on said platform and rail, and supporting-bars adapted to reciprocate longitudinally and carrying the dowel-drills, and the frame adapted to reciprocate vertically within the stand which supports the platform, and carrying the saw and slotting-drill, substantially as shown and described.

4. The guide-blocks O, resting upon the platform and adjustably secured to the abutment-rail N, and having adjustably attached thereon the leveling-links P, in combination with the gripping devices, substantially as and for the purpose set forth.

5. The block G, adapted to slide within dovetailed bearings in the platform D, and provided with pin K, in combination with the cam-lever having curved elongated slot L, and pivoted to the block I, adapted to slide in said bearings, the abutment-rail, and the guide-blocks adjustably secured thereto, substantially as and for the purpose specified.

6. In combination with the block G, constructed and arranged as described, and the cam-lever J, provided with a curved longitudinal slot, L, engaging with a pin, K, projecting upward from the block, the set-screw M, passed through said lever through the block I, arranged to slide in dovetailed bearings, said screw adapted to bear against the platform and thereby clamp the block, abutment-rail N, and guide-blocks O, adjustably attached to said rail, substantially as shown and described.

7. The abutment-rail having at its upper surface perforations $d$, and with central longitudinal openings, $f$, extending through the same from side to side, in combination with the brackets G', supporting the bars carrying the dowel-drills, capable of a longitudinal reciprocation, the guide-blocks O, carrying the leveling-links, and the gripping devices arranged to slide in dovetailed bearings in the platform, substantially as set forth.

8. The vertically-reciprocating frame S, carrying the drill X and circular saw V, in combination with the set-screws D' F', placed above and below the frame, respectively, whereby the drill and frame may be limited in their movement, substantially as set forth.

9. The forked lever Z, pivoted to the frame S, capable of a vertical reciprocation and connected to the drill X by means of pins extending within a groove in a collar, C', secured on said drill, whereby the drill may be thrown inward, in combination with the guide-blocks O, adjustable along the abutment-rail N, and carrying the leveling-links P, and the gripping devices arranged to slide in dovetailed bearings in the platform, and adapted to clamp the molding against the said blocks and rail, substantially as and for the purposes set forth.

In testimony whereof I affix my signature in presence of two witnesses.

EDWARD L. GAYLORD.

Witnesses:
S. S. WILLIAMSON,
W. J. HAVILAND.